Feb. 3, 1931.    G. H. WHITTINGHAM    1,791,458
SLIP SWITCH MECHANISM
Filed Dec. 28, 1929    2 Sheets-Sheet 2
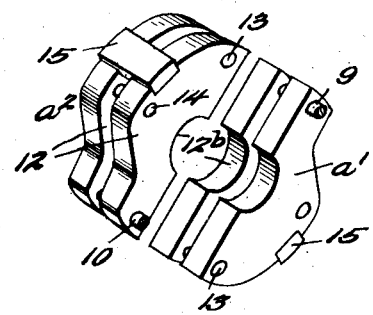
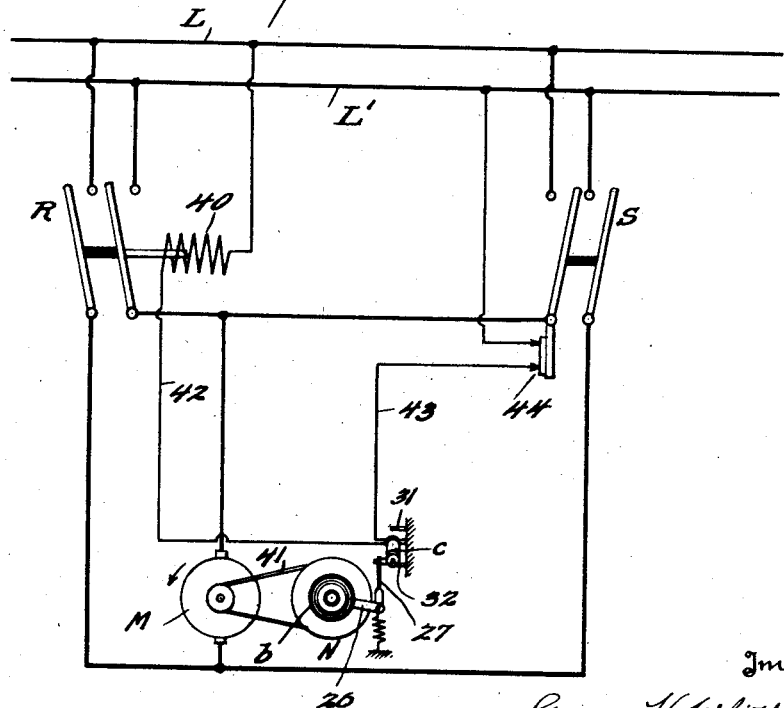
Inventor
George H. Whittingham
By
Robert Watson
Attorney Patented Feb. 3, 1931

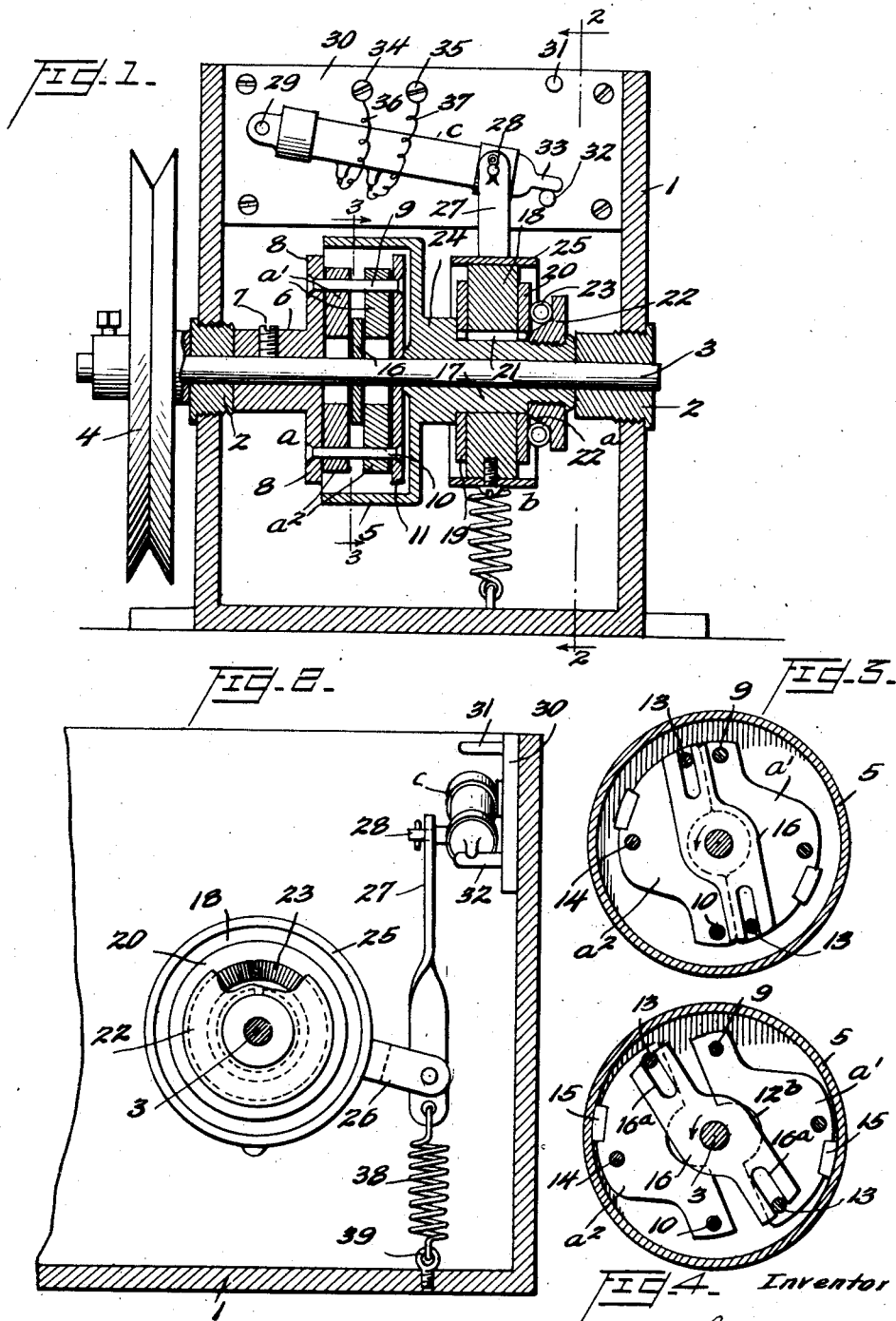

1,791,458

UNITED STATES PATENT OFFICE

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND

SLIP-SWITCH MECHANISM

Application filed December 28, 1929. Serial No. 417,189.

This invention relates to switch operating mechanism adapted for application to reversible shafts, the purpose of the invention being to provide means for opening or closing a circuit automatically when the shaft slows down and before it starts in the reverse direction.

The invention is adapted particularly for use as an aid in the stoppage of induction motors. Thus, where a dynamic braking action is applied to an induction motor of the wound-rotor type, to stop the motor, by temporarily reversing the current phases in the rotor circuits, in well known manner, the mechanism of the present invention may be used to cause the interruption of the braking current at a predetermined time before the rotor of the motor comes to rest.

In the accompanying drawing, which illustrates the invention,

Fig. 1 is a central vertical section through the switch-actuating mechanism, and the enclosing casing, taken on the line of the shaft;

Fig. 2 is a section on the line 2—2 of Fig. 1;

Fig. 3 is a section on the line 3—3 of Fig. 1, showing the clutch disengaged;

Fig. 4 is a similar view showing the clutch engaged;

Fig. 5 is a perspective view of the clutch levers; and,

Fig. 6 is a diagram illustrating the application of the device to an electric motor for causing the interruption of the braking circuit.

Referring to Figs. 1-4, inclusive, of the drawing, 1 indicates a suitable casing, in the opposite sides of which are provided bearings 2, in which a shaft or spindle 3 is journaled. The shaft is driven by the motor which is to be controlled, and a pulley 4 is provided on the spindle for this purpose. Upon the spindle is secured a centrifugally-operated driving clutch member $a$, and a sleeve 17 journaled upon the shaft has at one end a drum 5, which surrounds the member $a$ and constitutes the driven member of the clutch. A frictionally driven device $b$ is mounted on the sleeve. The driving clutch member comprises a hub 6, secured to the shaft as by a set screw 7 and having oppositely extending radial flanges 8, which are rigidly connected by cross-pins 9 and 10 to a parallel flat bar 11, through which the shaft extends. The cross-pins 9 and 10 are diametrically opposite one another and spaced equal distances from the center of the shaft and weighted levers $a'$ and $a^2$ are pivoted on these pins. These levers are alike in form and weight. Each lever, as shown in Figs. 1 and 5, comprises two parallel plates 12, secured together and spaced apart by studs 13 and 14. The levers lie on opposite sides of the spindle with their adjacent edges approximately parallel, and these edges are cut out, as shown at $12^b$, to permit the shaft to pass through. Strips of fiber, or other suitable material, 15 are set into notches formed transversely in the outer edges of the levers and the strips constitute shoes for engaging the drum 5 when the levers are thrown outwardly, as shown in Fig. 4. An equalizing lever 16 is centrally pivoted on the spindle and provided at its ends with longitudinal slots $16^a$. This equalizing lever lies in a plane beween the plates composing the weighted levers, and the studs 13, which are adjacent the free ends of the latter levers, extend through the slots $16^a$. It will be apparent from an inspection of Figs. 3 and 4, that as the weighted levers swing outwardly or inwardly around their respective pivotal studs 9 and 10, they will necessarily move to the same extent, though in opposite directions, by reason of the equalizing connection between their free ends. Hence, when thrown outwardly, the shoes 15 will engage the drum 5 at the same time and bear with equal force against the drum, and when the levers move inwardly these shoes will leave the drum at the same time. The shoes are spaced so that they engage the drum at diametrically opposite points.

The friction device $b$ comprises a cylinder of impregnated wood 18, loosely mounted on the sleeve 17, metal disks or washers 19 and 20 arranged at opposite sides of the cylinder and keyed to the sleeve by tongues which enter a keyway 21 in the sleeve, a nut 22, which is threaded on to the sleeve and which has an outer conical surface 22ᵃ, around which is placed an endless helical spring 23, which bears against the side of the washer 20. The washer 19 rests against a shoulder 24 on the sleeve. With this arrangement, the spring causes the washers to bear against the opposite sides of the wooden cylinder with relatively light friction, which can be varied by tightening or loosening the nut 22.

The essential features of this friction device are described in my co-pending application Serial Number 365,915; filed May 25, 1929. The drum 5 is integral with the sleeve and these parts are preferably made of an aluminum alloy so that they will be light in weight and have little tendency to rotate by their own inertia after the centrifugally-operated clutch member is released from the drum. A metal band 25 is secured to and surrounds the cylinder 18 and a short arm or lever 26 projects outwardly from this band and is pivotally connected to a vertically extending rod 27. The upper end of this rod is pivotally connected at 28 to a band which surrounds one end of a mercury switch c. This switch is of well known form, comprising a glass tube containing mercury and an inert gas and having terminal wires extending into the tube which are electrically connected by the mercury when the tube is inclined in one direction, and this connection is broken when the tube is tilted oppositely. The end of the tube opposite the rod 27 is pivotally connected at 29 to a base of insulating material 30. Upper and lower stops 31 and 32 are arranged in line with a projection 33 at the free end of the tube. Binding posts 34 and 35, secured to the base, are connected by flexible wires 36, 37, respectively, to the terminals of the tube. When the tube is tilted into the position shown in Fig. 1, in which the projection 33 rests against the stop 32, the electrical connection between the terminals will be broken, and when the tube is rocked so that the projection 33 engages the stop 31, the mercury will travel toward the pivoted end of the tube and electrically connect the terminals. A spring 38 is connected to the lower end of the rod 27 and to an eye 39 at the base of the casing 1. This spring normally holds the mercury switch in the position shown in Fig. 1.

In Fig. 6, I have illustrated diagrammatically the manner in which the combined clutch and friction device is used to cut off the braking current from an electric motor after the motor has slowed down to a very low speed. In this figure, L and L' represent alternating current supply wires, S indicates the main switch for connecting an induction motor M to the supply wires to cause it to operate in one direction, and R indicates a reverse switch for reversing the current phases in the motor to cause it to quickly slow down. The reverse switch is normally open and a magnet 40 is adapted to close the switch when the magnet is energized. The switching device of the present invention is shown at N, its pulley being connected to a pulley on the motor by a belt 41. The circuit for the magnet 40 extends from the line L, through conductor 42 to the mercury switch c, which is normally open while the motor is stopped, and through conductor 43 and switch 44 to the supply wire L'. The switch 44 is associated with the main switch so that it opens before the main switch closes and closes after the main switch opens. The heavy lines indicate the motor circuits.

In operation, when the main switch is closed current will flow through the motor to cause it to operate in the direction for driving its load, which, in the diagram, is supposed to be in the direction indicated by the arrow. As the motor starts, the weighted levers in the clutch will quickly fly outward by centrifugal force and the shoes on the levers will engage the drum which is connected to the sleeve 17 on which the friction device is mounted. This drum will thus be tightly clutched to the driving spindle and the sleeve and washers 19 and 20, the nut 22 and helical spring 23 will rotate with the drum and spindle. The wooden cylinder 18, against which the washers bear frictionally, will be rocked so as to cause the arm 26 to move the rod 27 upwardly, against the action of the spring 38, and this upward movement of the rod will tilt the mercury switch to the closed position. The stop 31 limits the upward movement of the switch and the cylinder of the friction device remains stationary as long as the motor is in operation. When it is desired to stop the motor, the main switch is opened and this causes the closure of the switch 44 and current then flows through the magnet 40 of the reverse switch and through the mercury switch c and switch 44. The magnet closes the reverse switch which reverses the current phases in the motor and the motor quickly slows down. The motor would come to rest and immediately change its direction of rotation if the reverse switch were left closed. It is desirable to open the reverse switch before the motor reverses its direction of rotation and in the present invention the reverse switch is opened shortly before the motor comes to rest. When the motor slows down to a predetermined speed, the weighted levers of the centrifugal clutch release their grip on the drum of the friction device and the spring 38 then pulls the cylinder of said device backward and the rod 27 downward, and the mercury switch is thereby rocked until its free end rests on the stop 32. In this position, the circuit through the mercury switch is open and as this switch is in series with the magnet 40 of the reverse switch, the latter switch opens immediately following the opening of the mercury switch.

During the normal running of the motor, the weighted levers of the centrifugal device hold the drum of the friction device firmly and there is no slippage which would cause wear between the parts of the clutch. Both of the levers bear with equal force against the drum and, in stopping, when the speed is insufficient to lock the levers to the drum, both levers release at the same time. The sleeve 17 and drum 5, being made of aluminum alloy, have very little inertia and these parts stop and move backward with the friction cylinder as soon as they are released by the clutch.

What I claim is:

1. Means for controlling the dynamic braking circuit of an alternating current induction motor comprising a shaft rotatable by the motor, a member journaled on the shaft, a device frictionally engaging said member, a switch operable by said device, and means for clutching said member to the shaft when the motor starts and for releasing said member when the motor slows down and before it stops.

2. Means for controlling the dynamic braking circuit of an alternating current induction motor comprising a shaft rotatable by the motor, a member journaled on the shaft, a device frictionally engaging said member, a switch operable by said device, and centrifugally operated means on the shaft for clutching said member to the shaft when the motor starts and for releasing said member when the motor slows down and before it stops.

3. Means for controlling the dynamic braking circuit of an alternating current induction motor comprising a shaft rotatable by the motor, a sleeve journaled on the shaft, a device frictionally mounted on said sleeve, a switch operable by said device, and centrifugally operated means on the shaft for clutching said sleeve to the shaft when the motor starts and for releasing said sleeve when the motor slows down and before it stops.

4. Means for controlling the dynamic braking circuit of an alternating current induction motor comprising a shaft rotatable by the motor, a sleeve journaled on the shaft, a drum connected with the sleeve, a device frictionally mounted on said sleeve, a switch operable by said device, and centrifugally operated means on the shaft within the drum adapted to clutch the drum to the shaft when the motor starts and to release the drum when the motor slows down and before it stops.

5. Means for controlling the dynamic braking circuit of an alternating current induction motor comprising a shaft rotatable by the motor, a member journaled on the shaft, centrifugally operated means for clutching said member to the shaft while the motor is operating at normal speed and for releasing said member when the motor slows down and before it stops, a device frictionally engaging said member, a switch movable in one direction by said device when the member is clutched to the shaft, and means for moving said device and switch in the opposite direction when said member is released by the clutching means.

6. Means for controlling the dynamic braking circuit of an alternating current induction motor comprising a shaft, a member journaled on the shaft and having a drum, a frame secured to the shaft, weighted levers pivoted to said frame at opposite sides of the shaft and adapted to grip the drum and drive said member when the motor is operating normally, an equalizing lever journaled centrally upon the shaft and having its ends slidingly connected to the free ends of the weighted levers, a device frictionally engaging said member, a switch movable in one direction by said device when said member is driven, and means for moving said switch in the opposite direction when the motor slows down and said weighted levers release said member.

In testimony whereof I affix my signature.

GEORGE H. WHITTINGHAM.